United States Patent [19]
Woodward

[11] 3,894,766

[45] July 15, 1975

[54] CARGO CARRYING VEHICLE

[76] Inventor: Ernest F. Woodward, 11 Circle Dr., Camp Hill, Pa. 17011

[22] Filed: Dec. 6, 1973

[21] Appl. No.: 422,389

Related U.S. Application Data

[60] Division of Ser. No. 324,339, Jan. 17, 1973, Pat. No. 3,811,724, which is a continuation-in-part of Ser. No. 186,051, Oct. 14, 1971, Pat. No. 3,794,375, and Ser. No. 210,498, Dec. 21, 1971, Pat. No. 3,764,177.

[52] U.S. Cl. .................... 296/104; 52/90; 105/377; 135/7.1 R
[51] Int. Cl.² ......................................... B62D 25/06
[58] Field of Search...... 296/104, 102, 43, 36, 10 S; 135/3 R, 3 A, 7.1 R, 7.1 A; 52/90, 646; 105/377

[56] References Cited
UNITED STATES PATENTS

| | | | |
|---|---|---|---|
| 2,144,747 | 1/1939 | Adams | 135/3 R |
| 2,358,446 | 9/1944 | Couse | 296/104 |
| 2,565,746 | 8/1951 | Turner | 296/104 |
| 2,836,860 | 6/1958 | Staropoli | 52/90 |

FOREIGN PATENTS OR APPLICATIONS

| | | | |
|---|---|---|---|
| 559,772 | 4/1957 | Belgium | 296/104 |

*Primary Examiner*—Robert J. Spar
*Assistant Examiner*—Gary Auton
*Attorney, Agent, or Firm*—Jay M. Cantor

[57] ABSTRACT

A quickly removable two-part stake for a flat bed cargo carrying vehicle, the parts of which are easily attached together to form between them opposite channels for retaining the side edges of panels therein, and for quickly detaching them for removing the panels. The relative lengthwise movements of the parts of the stake and panels in both instances, are much less than the height of the panels or stakes. Also, the stakes provide both anchoring and storage means for tarpaulin bows which have pivoted ends removably anchored in the stakes. A tie-down for the cargo which passes under the bottom edge of a panel is anchored to an anchor base secured to the edge of the platform outside of the enclosure formed by the removable panels.

2 Claims, 11 Drawing Figures

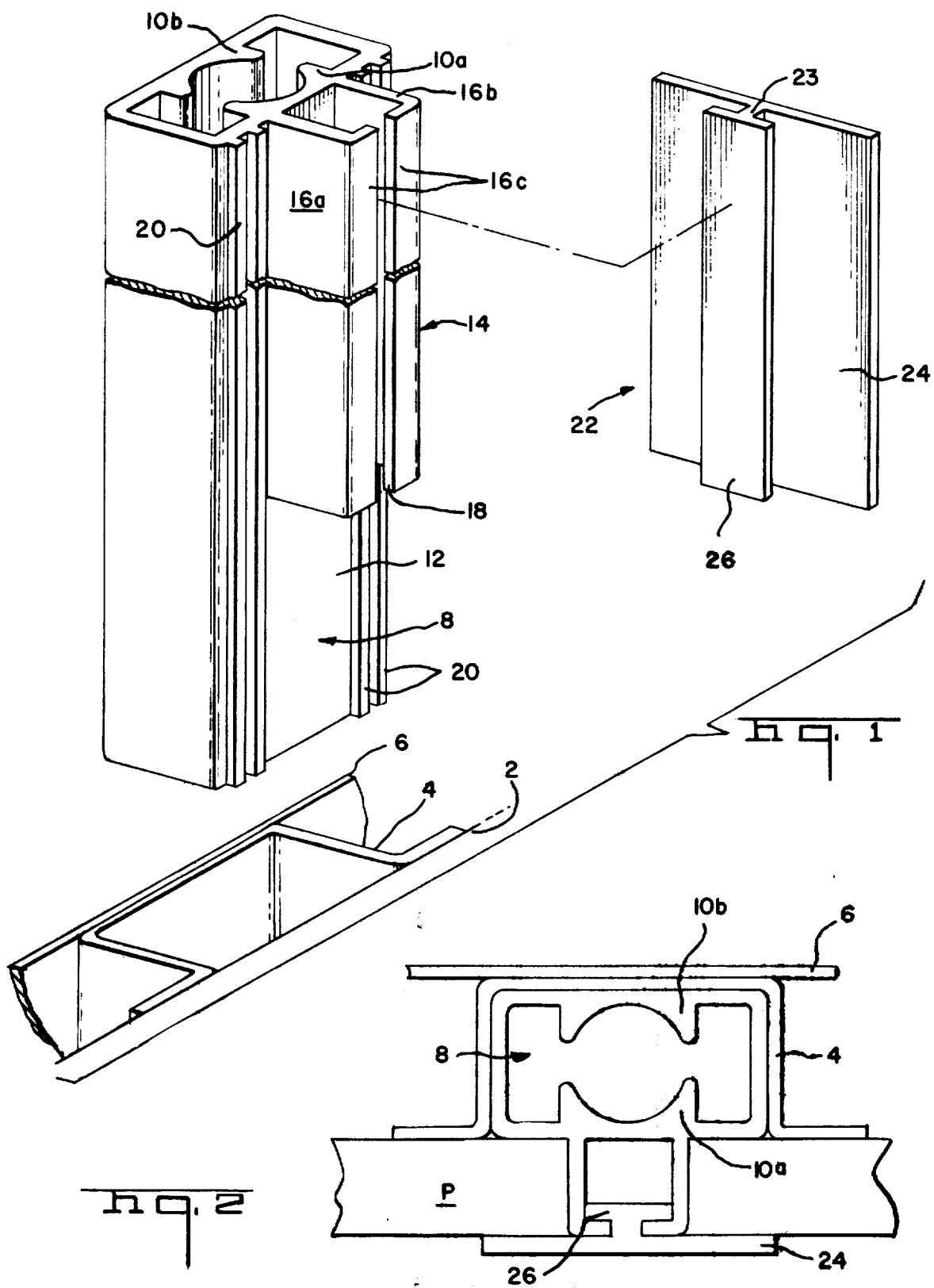

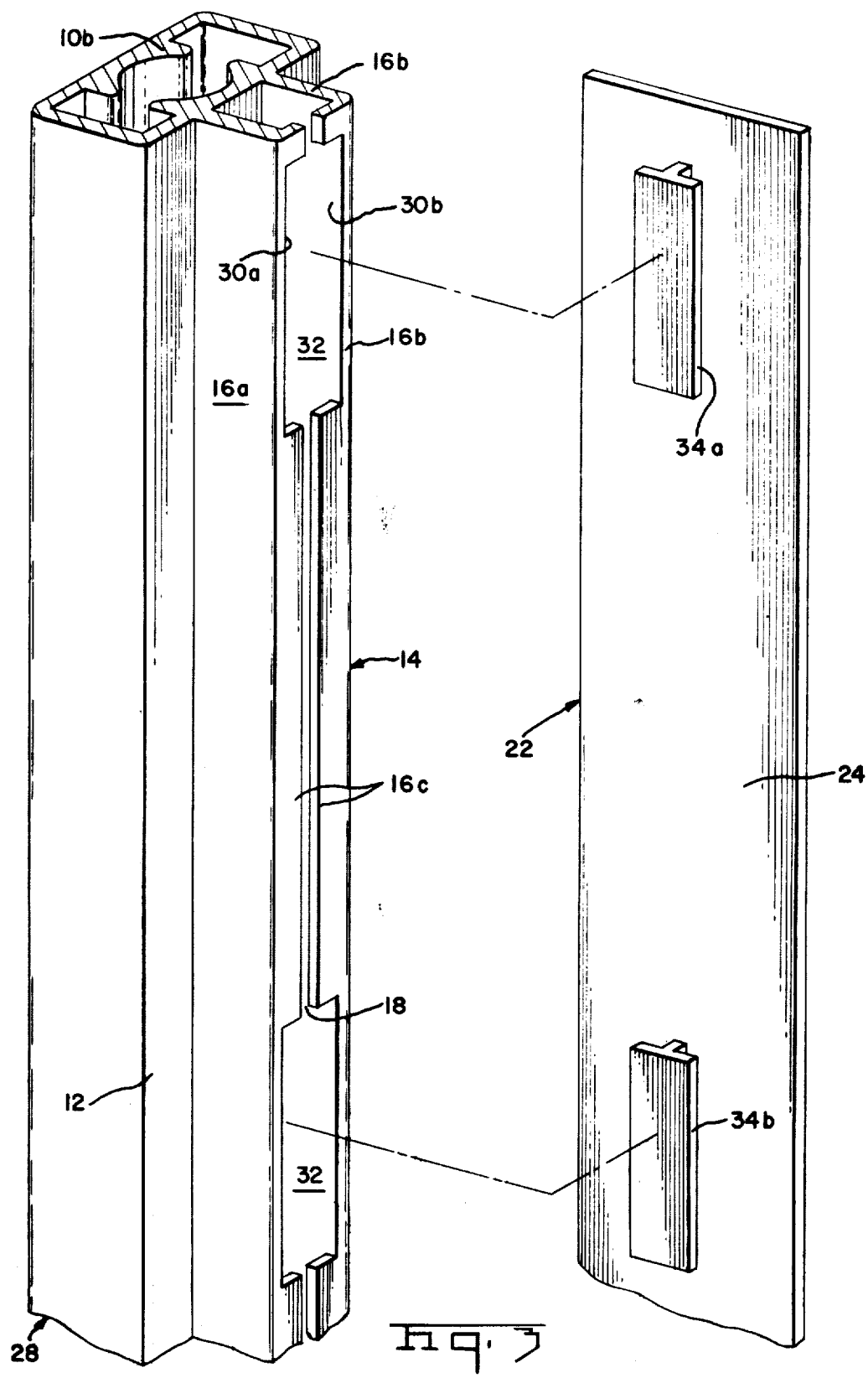

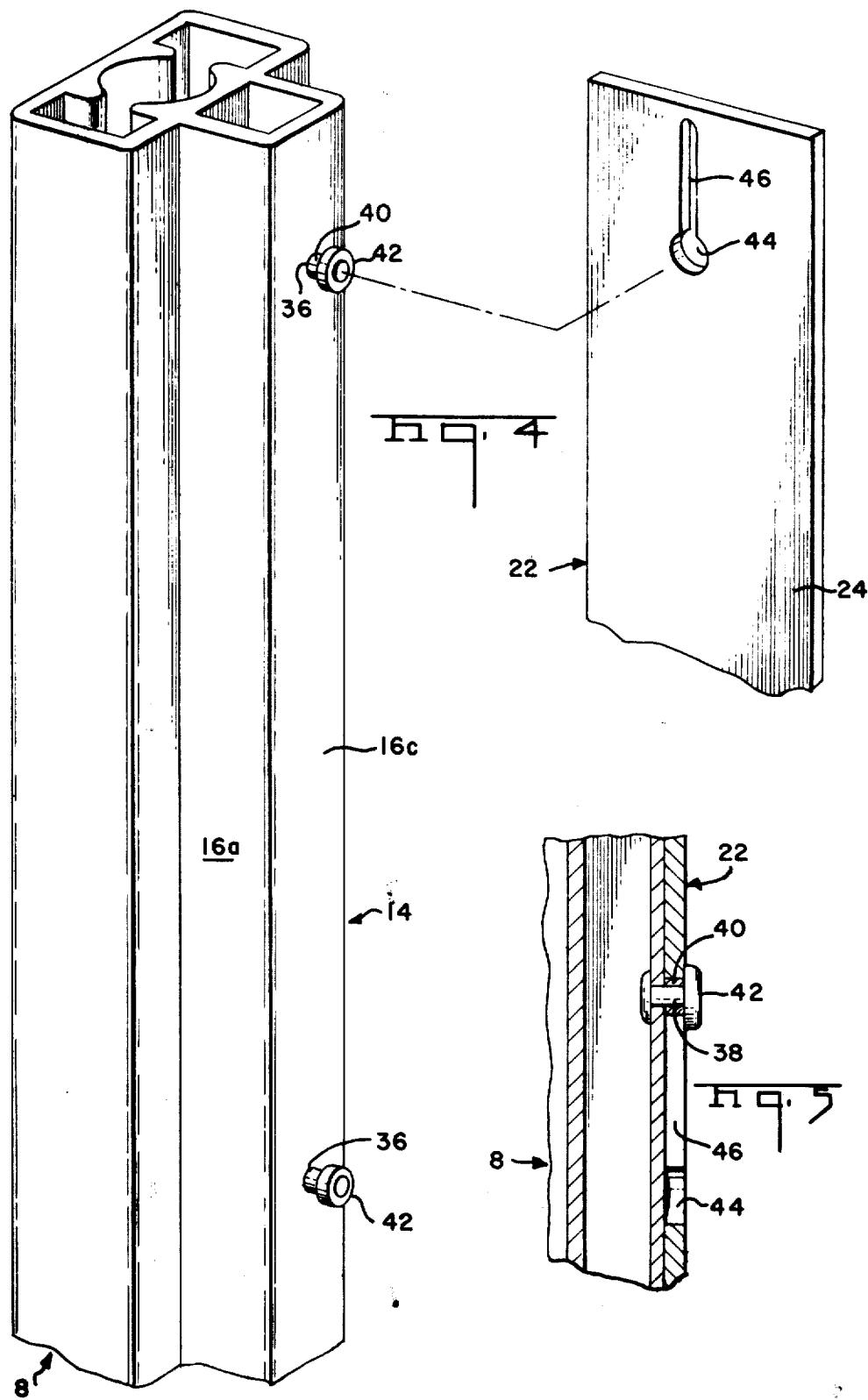

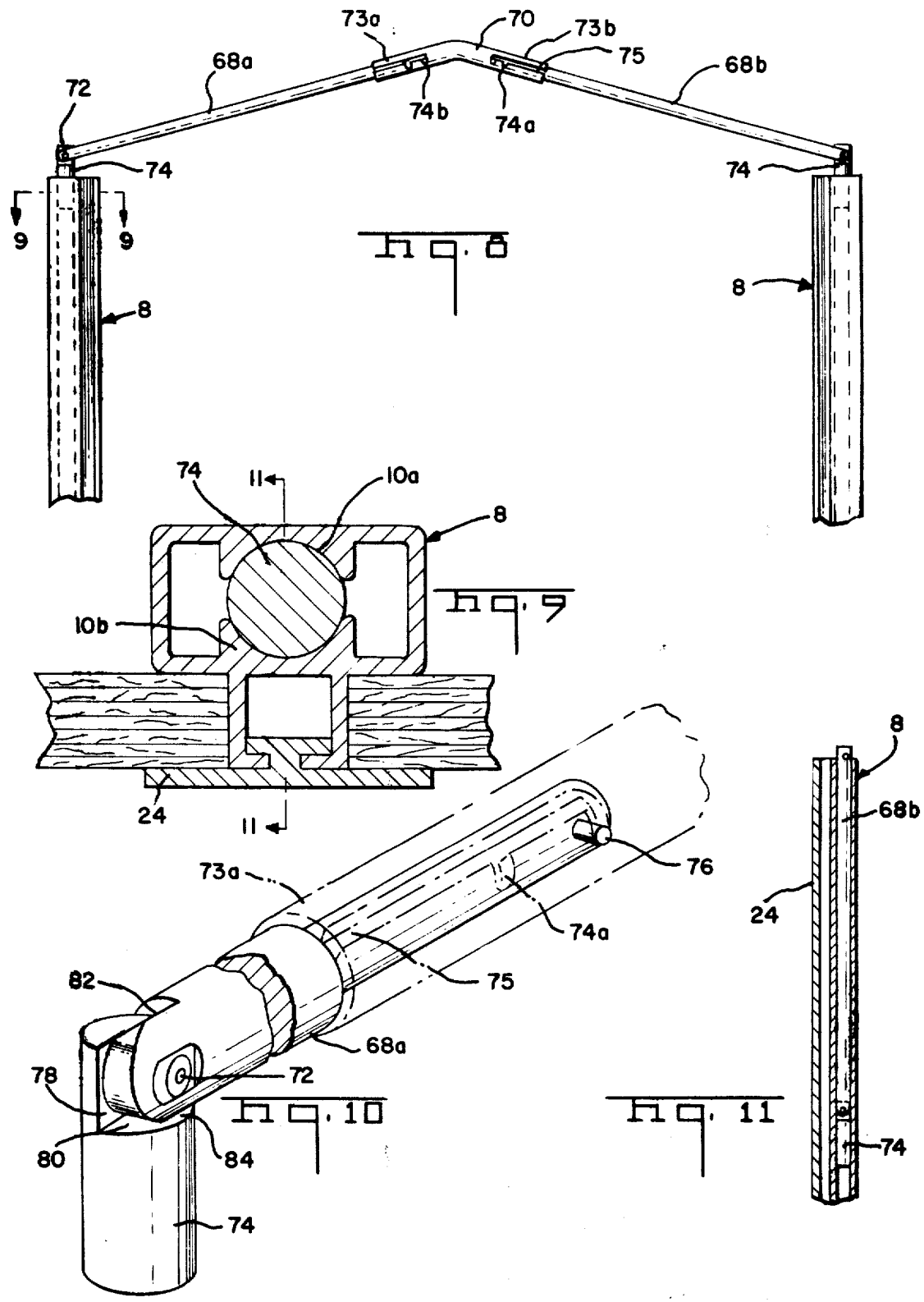

3,894,766

CARGO CARRYING VEHICLE

This is a division of application Ser. No. 324,399, now U.S. Pat. No. 3,811,724, filed Jan. 17, 1973, which is a continuation-in-part of my prior co-pending applications, Ser. No. 186,051, now U.S. Pat. No. 3,794,375, filed Oct. 14, 1971, for "Detachable Vehicle Enclosure" and Ser. No. 210,498, now U.S Pat. No. 3,764,177, filed Dec. 21, 1971, for "Stake Pocket Adapter."

In the above applications, there are disclosed various forms of stakes which are removably mounted in the usual pockets provided about the open platform of a flat bed trailer or truck. The walls of the stakes facing inwardly of the platform are each provided with a longitudinally extending bar almost the length of the stake, which is T-shaped in cross-section with the leg of the T secured to such wall to form opposite channels facing like channels of stakes spaced from either side thereof. The opposite side edges of a panel are retained in the channels between a pair of adjacent stakes. At least one of the stakes designated as a "quick-start" stake, is modified to the extent that instead of a single T-shaped bar extending the length of the stake, except near its lower mounting end, a plurality of small T-bar sections are spaced along the length of the stake. The pair of panels which fit in the channels provided by such sections, are notched along their adjacent edges and suitably spaced to form between them openings for the passage of the heads of the T-bar sections. This type of stake is useful for obtaining a quick and easy start in disassembling the panels from a fully boxed-in condition or to lock in place the final panels in building a complete enclosure, without the necessity of raising the stake or panel the full length thereof in order to free them from one another or to assemble them in interengaging relation.

SUMMARY OF THE INVENTION

The stake structure of this invention is an improvement over the stake of the co-pending applications heretofore referred to. The present stake is constructed of two parts consisting of the stake body per se and a separate flange attachment which is easily attachable thereto to form the longitudinally extending channels for the panels. The two-piece stake structure of this invention may be so constructed as to have a fully extending longitudinal slot on one piece for cooperation with the leg of a longitudinally extending T-bar secured at its end to the other piece and slidable within the slot. In this case, they are assembled by a full length sliding movement of one relative to the other and disassembled in the same way, by a sliding movement in the opposite direction.

The two-piece stake may also be so modified that their relative movements for assembling or disassembling them need not be the full length of the parts. To effect this, one of the pieces may be provided with a plurality of longitudinally spaced short T-bar sections or other similar structure each having the end of a narrow leg attached thereto with the head projecting forwardly. The other of the pieces is then provided with longitudinally spaced openings therethrough to pass the enlarged heads with a slot extending longitudinally from the edge of each of the openings to accommodate the narrow leg. The spacing between the openings is the same as that between the heads, so that only a slight movement lengthwise of one part relative to the other is necessary to lock the two parts together when the enlarged head has entered the opening or when the narrow leg is within the slot. The last described two-piece stake is of course, especially useful for locking the final pair of panels in place to complete an enclosure and for disassembling the first two panels of an enclosure.

The invention further contemplates an improvement in the removable overhead bow structure which is anchored at its ends in the upper end of the stakes for supporting a tarpaulin. This improvement lies in making the bow of two separate substantially equal straight parts connected together by an adjustable and removable center connection. In addition, the ends of the bows, which fit into the upper ends of the stakes, are pivoted to the straight sections. When the bows are disconnected at their centers, the pivoted portions of the bow sections are alined and may be inserted entirely within the stake.

It is also contemplated to provide an improved cargo tie-down structure which is especially useful in the environment of a cargo carrier which is enclosed by removably mounted panels. This is accomplished by one or a plurality of welded anchor shoes or lugs welded to the sides of the cargo carrier. The tie-down has a hook-like end which hooks under the anchor shoe and is connected to a chain extending over the cargo by a planar section which extends under the lower edge of a panel along the floor of the platform.

It is therefore an object of the invention to provide a two-part stake which is easily assembled and disassembled.

It is another object of the invention to provide a two-part stake forming full length channels retaining the edges of panels which can be disassembled from the panels of a fully enclosed cargo carrier without relative sliding movements of the length of the panels or stake.

It is a still another object of the invention to provide a tarpaulin supporting bow which can be stored within the stakes used for supporting enclosing panels.

It is a further object of the invention to provide a tie-down arrangement for passing under a panel of an enclosure for a cargo carrier for anchoring on the outer edge of such carrier.

These and further related objects are accomplished by a preferred embodiment of the invention as illustrated in the drawing wherein:

FIG. 1 shows in perspective the disassembled basic stake having the locking means extending substantially its entire length;

FIG. 2 is a top view of the parts of FIG. 1 in assembled relation and mounted in the pocket of the truck or trailer;

FIG. 3 is a view similar to FIG. 1 showing the stake with the locking portions of the stake modified to spaced along the length thereof;

FIG. 4 is a view similar to that of FIG. 3 with a still further modified form of locking means;

FIG. 5 is a cross-sectional portion of the two parts of the stake of FIG. 4 in assembled relation;

FIG. 8 is an end view of the two-part tarpaulin support bow support and its connector mounted in stakes on opposite sides of the truck or trailer;

FIG. 9 is a cross-sectional view along line 9—9 showing the end of the bow mounted within the upper end of the stake;

FIG. 10 is a detail view of the connector for the two-piece bow support; and

FIG. 11 is a sectional view along line 11—11 showing one of the bow-sections telescoped within the stake for storage purposes.

Figure 6:
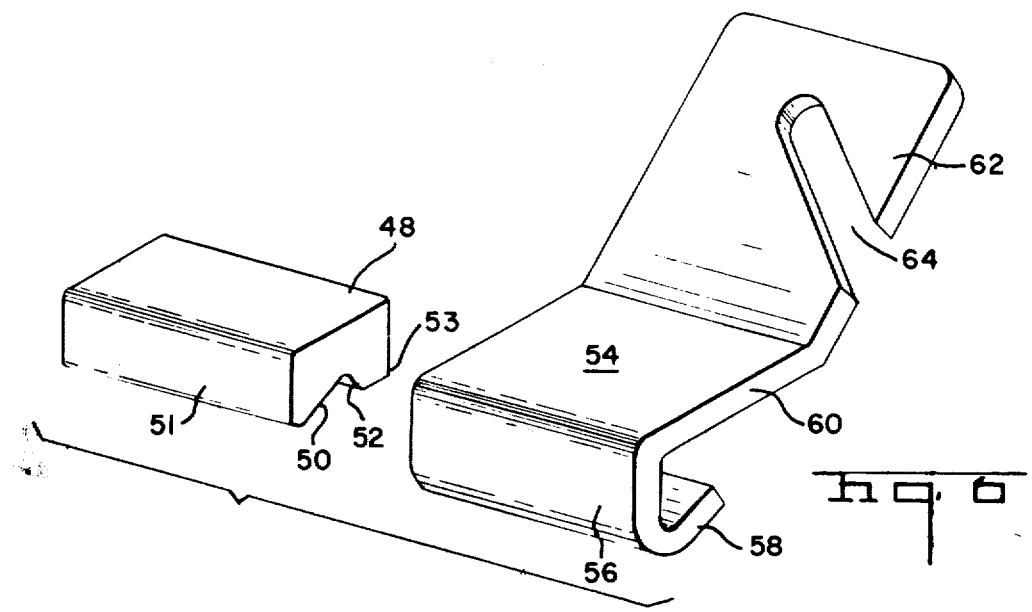
FIG. 6 is a view in perspective of the hook-like claw or tie-down and the anchor structure about which it is hooked.

With specific reference to the drawing, reference numeral 2 of FIG. 1 designates the metal edge rail or frame surrounding the platform of the truck or trailer upon which the cargo is supported. A plurality of stake pockets 4 are secured as by welding to the metal edge rail 2 and a rub-rail 6, welded to the outer walls of the sockets, extends about the periphery of the platform. The stake body 8 is exteriorly dimensioned to snugly fit within the socket 4 in order to be held firmly in upright position. Although shown as being rectangular, it may be of any desired shape. The stake body is shaped interiorly by oppositely spaced arcuate wall portions 10a and 10b to receive between them a section of a tarpaulin support bow which is circular in cross-section as shown in FIG. 8 and which will be later described.

Formed on the front wall 12 of the stake body 8 is a substantially hollow box-like tubular structure 14 extending lengthwise of the stake body centrally thereof. The structure 14 is provided by a pair of side walls 16a, 16b projecting from the wall 12 transversely thereto. The front wall 16c of the structure 14 is slotted centrally lengthwise thereof. The structure 14, as shown, terminates short of the lower end of the stake body so that its lower edge rests on the platform to which the frame 2 is secured and prevents the stake body from falling through the pocket 4. The front wall 12 is shown with a plurality of spaced, longitudinally extending ribs 20 thereon, and the entire structure 14 as shown, may be a single extruded member so that all of the described parts are integrally related.

The other portion of the two-piece stake is provided by the flange structure 22 which comprises a flat wall 24 and a co-extensive T-bar with the leg 23 of the bar projecting from the longitudinal center of the wall 24. The thickness of the material of the leg corresponds to the width of the slot 18 and the distance of the head portion 26 of the T-bar from the wall 24, is substantially the thickness of the wall 16c. The flange structure 22 can also be extended as a single integral member. When the head portion 26 is located within the structure 14, as shown in FIG. 2, the distance between the wall 24 and ribs 20 corresponds to the thickness of a panel P whose marginal edge portion is retained in a channel formed by the assembled members 8 and 22, the width of the wall 24 being substantially equal to that of wall 12. If thicker panels are to be used for the enclosure, the ribs 20 may be cut or ground away to provide an increased distance between the wall 24 and the stake body. If desired, the ribs may be provided on the flange structure also.

The stake body 28 of FIG. 3, is basically similar to that shown in FIG. 1 and like parts will be designated by like reference numerals. In this stake body, the front wall 16c has been modified by forming confronting notches 30a, 30b in the edges of the wall forming the slit 18. These notches between them, form a rectangular opening 32 and several of such longitudinally spaced openings are formed in the tubular structure 14. The flange structure 22 of FIG. 3 is similar to that in FIG. 1 but instead of a single longitudinally extending T-bar, a plurality of small T-bar sections 34a, 34b are formed on the wall 24 of the flange section. These small T-bar sections are spaced apart the same distance as the openings 32, which latter are dimensioned to permit passage therethrough of the heads 34a, 34b of the T-bar sections. After the T-bar sections have passed through the openings 32 the flange member 22 is slid downwardly to locate the head 34a behind the wall 16c. When the stake body 14 is mounted in a socket, the flange member 22 will rest on the floor of the truck or trailer by reason of the proper location of the lowermost opening 32 and the location of T-bar section 34b relative to its bottom edge.

FIG. 4 shows a further modification of the interlocking feature between the stake body and the removable flange structure. In this Figure, the front wall 16c of the box-like structure 14 is provided with a plurality of longitudinally spaced openings 36 therethrough. A rivet is fastened in the opening by a shank 38 of a diameter to snugly fit therein. A bushing 42 on the shank having an exterior diameter greater than the opening in wall 16c is located between the rivet head 42 and the wall. The end of the shank within the structure 14 is upset to firmly retain the rivet thereon. The above is of course only an example of one possible way of anchoring a projecting member having an enlarged head to the wall 16c. Such projecting member may take the form of a bolt threaded into the opening or the free end of its shank may be welded to the wall. The flange portion 22 of the two-piece stake is a strip of rigid material provided only with longitudinally spaced openings 44 (only one of which is shown) of a dimension to pass over the head 42 of the rivet secured on wall 16c. A slot 46 substantially of a width to accommodate the bushing 40 leads upwardly from the opening 44 to provide in effect, a keyhole. As before, the rivets and openings are so spaced that when the openings in flange structure 22 are passed over the heads 42 of the rivets and the member 22 pushed downwardly, the rivet heads will bear against the rear wall of the member 22 and the bottom edge of the latter will rest on the floor. The height of the bushing is such that it spaces the rivet head from the wall 16c the thickness of the material of member 22 so that the flange member will have very little transverse movement relative to the stake body.

The two-piece stakes heretofore described are preferably of extruded metal, preferably aluminum. As previously explained, the two-piece stakes of FIGS. 3 and 4 are especially useful in the removal of the first pair of panels from a side enclosure provided by such panels, since it would only be necessary to reach into the enclosure and raise the flange structure 22 a few inches until the enlarged heads of one of the stake pieces are in alinement with the openings in the other piece and then move it transversely to release the heads from the openings. The stake body 8 then need only be lifted a few inches out of the stake pocket and removed to expose the edges of a pair of panels. There is no need for an operator to stand on the narrow rub rail of the truck or trailer in order to raise a stake or panel to its full height when removing the first panel from a complete enclosure or to lock in the final panel, as in the prior art. In this respect, the two-piece stake provides an important safety feature since only the flanged member is raised slightly by standing on the rail while the stake body removal can be accomplished by standing on the ground.

For tying down the cargo being carried by a flat bed trailer or truck, it is the usual practice to weld anchor blocks to the cross-members below a trailer or truck or to the underside of the floor thereof and to pass the hook of the tie-down chains through the floor. The labor involved in installing such devices is time consuming and costly. In some cases where the anchor blocks are not installed, the hold-down chain hooks are anchored on the rub rail, which is only a relatively thin piece of strap steel between one-eighth to one-quarter inch in thickness welded to the stake pockets and is not very safe for this purpose. Where the trailer is enclosed by removable side or end panels, openings must be cut therethrough for passage of the tie-down.

Figure 7:
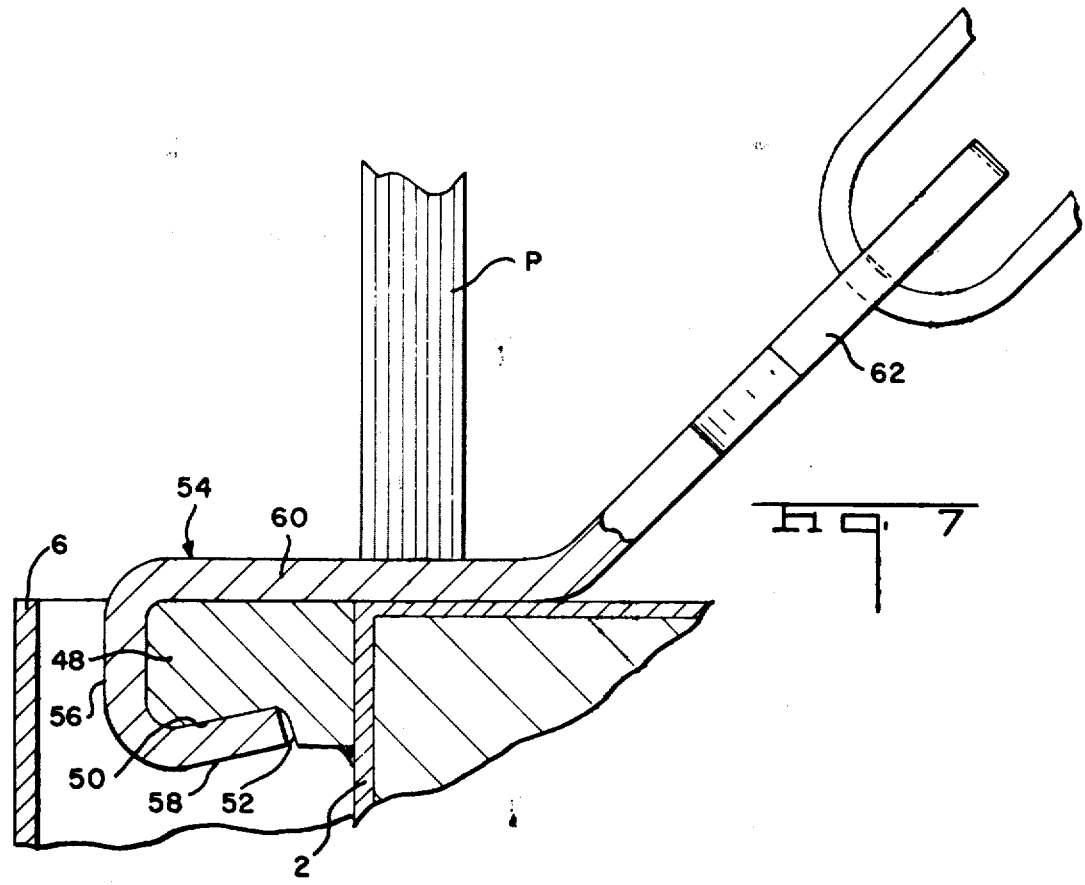
FIG. 7 is a vertical section of the side edge portion of the tie-down hooked about the anchor structure which is secured to the side edge of the cargo-carrying platform and showing the rub rail spaced outwardly therefrom.

I have therefore provided a tie-down arrangement which is economical to install and easily accessible without interfering with the side enclosure on the truck or trailer. With reference to FIGS. 6 and 7, I provide flat, solid anchor blocks 48 each of which is substantially rectangular in shape with one surface 50 sloping slowly inward from one edge of wall 50 toward its center and then sloping more abruptly outward toward the opposite wall to leave a shoulder 52. A plurality of these blocks are spaced about the trailer edge by welding to the edge frame 2 with its top surface substantially flush with the trailer floor. When so secured, the slowly sloping portion of surface 50 faces downwardly but slopes upwardly toward the trailer floor.

To the anchor block is removably secured a cooperating hook or anchoring device 54 comprised of a flat metallic rectangular strip having a short portion 56 bent transversely thereof at substantially a right angle. A short length 58 of the free end of portion 56 is then bent rearwardly toward the strip at an angle which is equal to that included between sloping wall 50 and the wall 51 of block 48. The height of portion 56 of the hook 54 is such as to snugly accommodate the wall 51 of the block within the channel provided by the bent back sloping portion 58 and the body of the hook. The bent back portion 58 terminates just short of the shoulder 52 of the anchor block 48 when the latter is within the bight of the hook 54. A linear portion 60 of the strip connects the portion 56 of the hook to an angularly related portion 62 bent upwardly at an obtuse angle and provided with a slot 64 which slopes upwardly from a side edge of the strip toward the other end thereof forming a hook-like portion for receiving the end link of a tie-down chain.

It should be noted that when the hook portion 56, 58 is slid sidewise over anchoring block 48, the linear portion 60 is horizontal and rests on the floor of the truck. The anchoring arrangement thus described does not interfere with the panels mounted in the stake supported by the truck to enclose the cargo or in removing them when the enclosure is being disassembled.

FIGS. 8–10 illustrate the multisection tarpaulin support bow of this invention. The bow is comprised of three separate sections 68a, 68b and 70. The sections 68a and 68b are similar so that a description of one will suffice to explain the other. A bow section such as 68a is comprised of a linear rod, to one end of which is pivoted, as at 72, a short cylindrical portion 74 of a diameter to frictionally fit within the stake portion 8 between the arcuate walls 10a, 10b. The third section of the bow is comprised of the element 70 which is in the nature of an adjustable connector extending between the free ends of the two sections 68a and 68b. The connector, as illustrated by way of example, comprises an angularly shaped member the free ends of the arms of which are in the form of hollow tubular sleeves 73a, 73b for telescoping over the free ends of the rods 68a, 68b. The connector 70 is so designed, that it is adjustable along the rods whereby the length of span of the bow can be changed to extend across trucks or trailers of different widths.

To this end, the tubular ends of the connector forming hollow sleeves are each provided with a longitudinally extending slot 75. One edge of the wall of the slot is notched at spaced locations therealong as shown at 74a, 74b. The ends of the rods located within the sleeves of the connector, are each provided with a pin 76 projecting laterally therefrom. When the pin is within the slot, it can be slid along the sleeve by a desired amount and turned into one of the slots 74a, 74b by turning the rod, to lock it to the connector against further movement. Although a telescoping and locking arrangement for relatively longitudinally adjusting the rod and connector to vary its length and to detachably connect together the two bow sections is illustrated, it is obvious that other adjustable and detachable locking arrangements can be used. Such other arrangements may include for example, a threaded screw connection between the rod sections and connector, an ordinary slip joint with a locking bolt to maintain the adjustment etc. The angled connector is of course necessary in order to provide the straight bow sections with a slope when assembled, to permit the tarpaulin to shed rain or snow without accumulating thereon.

The cylindrical stub 74 as shown, has a section of its uppermost end removed to leave a flat upright wall 78 extending diametrically and a flat seat portion. In the same way, the end of said bow section 68a, 68b opposite the end provided with the pin 76, is formed to provide a flat wall 82 facing the wall 78. The pivot 72 passes through the remaining sections of the end portion of the rod and cylindrical stub and is locked thereto at its ends in any suitable manner, to maintain the parts together in pivotal relation. The seat 80 of the stub portion 74 may be cut on a bias so that the portion 84 as shown, will form a stop for the rod section 68a and 68b to maintain them at an angle slightly greater than 90° relative to the axis of stub 74. This angle is complementary to one-half the angle included between the arms of connector member 70. The stop therefore cooperates with the connector to maintain the bow elevated at its center relative to its ends when the sections are assembled.

When it is desired to remove the bows, a stub 74 may be raised out of the stake body 8 and a bow section removed from one end of the connector 70, the latter then being easily removable from the other bow section without removing the latter from its stake body 8. This latter box section can then be rotated upwardly into alignment with the stub and slid downwardly into the stake body 8 for storing the bow section. The diameters of the bow sections and stubs 74 are made substantially the same for this purpose. The other bow section is similarly stored in the opposite stake body.

It should be recognized that while the drawings illustrate a preferred embodiment of the invention, it is obviously subject to modifications and variations by those skilled in the art of such nature as would fall within the spirit and scope of this invention as defined by the appended claims.

What is claimed is:

1. A collapsible support for a cover for a platform supporting a plurality of laterally spaced upright stakes each having an opening extending vertically from its upper end, at least one bow for extending between a pair of stakes for supporting the cover thereon, said bow including a pair of rods, each shaped to be slidably receivable within said opening in one of the stakes, an elongated hollow connecting member bent at its central portion to form a predetermined included angle of between 90° and 180°, said hollow member being shaped to removably and slidably receive an end portion of a rod within each end, a rod supporting member shaped to slidably enter the opening in each stake, cooperating means at the other end portion of each rod and one end of a rod supporting member for pivotally securing them together for movement in a vertical plane, the cooperating means being dimensioned to be received in the opening, whereby upon removal of said connecting member, the rod and its supporting member may be pivoted into alignment and slidably moved into the opening in the stake, stop means on each rod and its supporting member for limiting its movement toward each other to include an angle which is supplemental to said predetermined angle.

2. A collapsible member according to claim 1 wherein the supporting member and each rod are provided with cooperating means for maintaining them in longitudinally adjusted position relative to each other.

* * * * *